(12) United States Patent
Beltrame

(10) Patent No.: US 6,598,313 B2
(45) Date of Patent: Jul. 29, 2003

(54) EQUIPMENT FOR DRYING BALES FOR FORAGE OF ANY SHAPE WHATSOEVER

(75) Inventor: Giovanni Beltrame, Martino di Lupari (IT)

(73) Assignee: Clim.Air. 50 Srl (IT)

( * ) Notice: Subject to any disclaimer, the term of this patent is extended or adjusted under 35 U.S.C. 154(b) by 69 days.

(21) Appl. No.: 09/937,017

(22) PCT Filed: Dec. 22, 2000

(86) PCT No.: PCT/EP00/13212

§ 371 (c)(1), (2), (4) Date: Sep. 20, 2001

(87) PCT Pub. No.: WO01/56364

PCT Pub. Date: Aug. 9, 2001

(65) Prior Publication Data

US 2002/0133968 A1 Sep. 26, 2002

(30) Foreign Application Priority Data

Jan. 31, 2000 (IT) .................................. VI20000A0O21

(51) Int. Cl.[7] ........................... F26B 25/06; A01F 25/12; A01D 87/10

(52) U.S. Cl. .............................. 34/201; 34/218; 34/507; 34/194; 34/209; 34/210; 34/232; 34/238; 34/240; 56/341

(58) Field of Search .......................... 34/501, 507, 508, 34/540, 171, 177, 178, 192, 194, 195, 201, 202, 209, 210, 218, 232, 733, 237, 238, 240, 221, 222; 56/12.8, 341, 343, DIG. 23

(56) References Cited

U.S. PATENT DOCUMENTS

| | | | | |
|---|---|---|---|---|
| 1,436,142 A | * | 11/1922 | Bentz ........................ | 34/191 |
| 4,967,488 A | * | 11/1990 | Hirvensalo et al. ........... | 34/90 |
| 5,276,980 A | * | 1/1994 | Carter et al. .................. | 34/191 |
| 5,517,767 A | * | 5/1996 | Schinger et al. .............. | 34/174 |
| 6,079,119 A | * | 6/2000 | Magnusson .................. | 34/383 |
| 6,154,977 A | * | 12/2000 | Muzzarelli ................... | 34/225 |
| 6,212,793 B1 | * | 4/2001 | Goad .......................... | 34/441 |

FOREIGN PATENT DOCUMENTS

| | | |
|---|---|---|
| IT | PD920183 | 10/1992 |
| IT | MO940107 | 1/1996 |
| IT | MI962033 | 4/1998 |
| WO | WO 97/40330 | 10/1997 |

\* cited by examiner

Primary Examiner—Ira S. Lazarus
Assistant Examiner—K. B. Rinehart
(74) Attorney, Agent, or Firm—Dykema Gossett PLLC

(57) ABSTRACT

The invention produces equipment for drying bales of forage comprising: at least one unit for generating hot air (30) channeled onto at least one pair of treatment units (A, B) stack one over the other, each having a rectangular bottom chamber (2, 5) and top chamber (4, 6), kept apart by spacing devices (40, 41; 60, 61; 103, 104) supporting the top chamber above the bottom chamber, and where one or more telescopic columns (A1, A2, A3; B1, B2, B3) set between the bottom chamber and the top chamber transfer the hot air from the bottom chamber to the top one. The bales are set in each treatment unit between the bottom chamber (2, 5) and the top chamber (4, 6) stacked in two layers so that they can be dried by the countercurrent flow of hot air. One or more of the telescopic columns (A3; A1, A2) is provided with shutoff dampers (20; 101, 102) suited to opening/closing the air flow from the bottom treatment unit (A) to the top treatment unit (B).

21 Claims, 6 Drawing Sheets

EQUIPMENT FOR DRYING BALES FOR FORAGE OF ANY SHAPE WHATSOEVER

The invention concerns equipment for drying bales of forage regardless of their shape, which is usually round or square.

It is known that there is a need to dry forage after it has been harvested and arranged in bales of various shapes and sizes, such as for instance round or square, and this to take the forage to a controlled humidity content, for instance of around 15–18%, in order to avoid mould formation or fermentation starting that can lead to hindering the use of stored forage or nevertheless can lead to alimentary problems for the animals or even cause fires by spontaneous combustion of forage stored in barns.

The need to rationalize treatment plants and to avoid enormous structures, has given rise to the production of forage drying plants that can simultaneously treat at least two layers of bales blown by countercurrent airflows.

According to Italian patent IT 1259172 an existing dryer for round bales is described, which has a bottom chamber with several perforated compartments where the round bales are placed and a top chamber kept apart by a hollow, telescopic column and substantially the same as the bottom chamber. The two layers of bales are stacked one over the other and countercurrent airflows fed from the bottom chamber and the top chamber are used to dry the bales being treated.

One of the inconveniences that can be noted with this type of solution is that when the bales have anything other than a round shape, the plant described above does not satisfy the prerequisite of effectively drying since it has round air outlet holes, the corners for instance of a square bale, do not receive a correct drying action.

On the other hand there is a need to achieve optimum rationalization of drying plants in order to make them versatile and also functional for operators who use different kinds of forage harvesting machinery or in other words such machinery that produces round bales or square bales, for example by the use of presses with square sections.

In an attempt to overcome said inconvenience a dryer for bales of hay has been produced under international patent WO97/40330, which is provided with special adapters that, by changing the outlet air hole sections from circular to polygonal, optimize use of the dryer also for square shaped bales or, more generally, bales having other shapes than cylindrical.

The dryer produced according to the descriptions in the aforesaid international patent also have the advantage of developing in height thereby creating two floors of treatment, one stacked over the other, which reduces the overall dimensions of the plant against other equivalent plants.

However even the plant under said patent has a limitation, consisting in the impossibility to use only one of its treatment units.

This invention intends to overcome even this acknowledged limitation found in the aforesaid treatments plants with several units stacked over one another.

In particular a first scope of the invention is to produce a dryer made up of two treatment units stacked one over the other where the bottom treatment unit can even function independently to its overlying top treatment unit.

Another scope is to produce equipment for drying bales of forage that is universal, in other words that can basically achieve optimum drying of both round bales and square bales.

Moreover the intention is to make the changeover from treating round bales to treating square bales, or vice-versa, using the minimum amount of time and without requiring specialist personnel for changing the equipment.

Another intended scope is that the equipment under this invention can moreover even treat round and square bales at the same time.

Last but not least, a scope is to be able to provide equipment that does not require roofing or other constructions for protecting it from weathering.

All these scopes and others that will be better explained below are achieved by equipment for drying bales of forage comprising:

at least one unit for generating hot air equipped with a fan group that channels hot air onto at least one pair of treatment units stacked one over the other, each having a bottom chamber and a top chamber basically rectangular in shape, kept apart by spacing devices supporting the top chamber above the bottom, and where one or more telescopic columns set between the bottom chamber and the top chamber transfer the hot air from the bottom chamber to the top one, said telescopic columns being operated by said spacer devices, said bales being set in each treatment unit between the bottom chamber and the top chamber stacked in two layers, so that they can be dried by the countercurrent flow of hot air, wherein one or more of said telescopic columns is provided with shutoff dampers suited to opening/closing the air flow from the bottom treatment unit to the top treatment unit.

Under the invention each of the two, bottom and top chambers should preferably be box shaped having a surface where one or more basically flat metal panels are removably connected and having holes shaped according to the type of bale undergoing the drying treatment.

An advantage of this invention is that the metal panels may have a series of circular holes to host the round bales when the equipment is being used to put round bales through the drying treatment. Otherwise the metal panels can be replaced, both on the top chamber and the bottom one, so that they have basically rectangular holes suited to supporting and hosting square shaped bales according to the sizes currently in use.

Additional characteristics and details of the invention will be better explained in the description of a preferred form of execution given as a guideline but not a limitation and illustrated with the aid of the attached diagrams, where:

Figure 1:
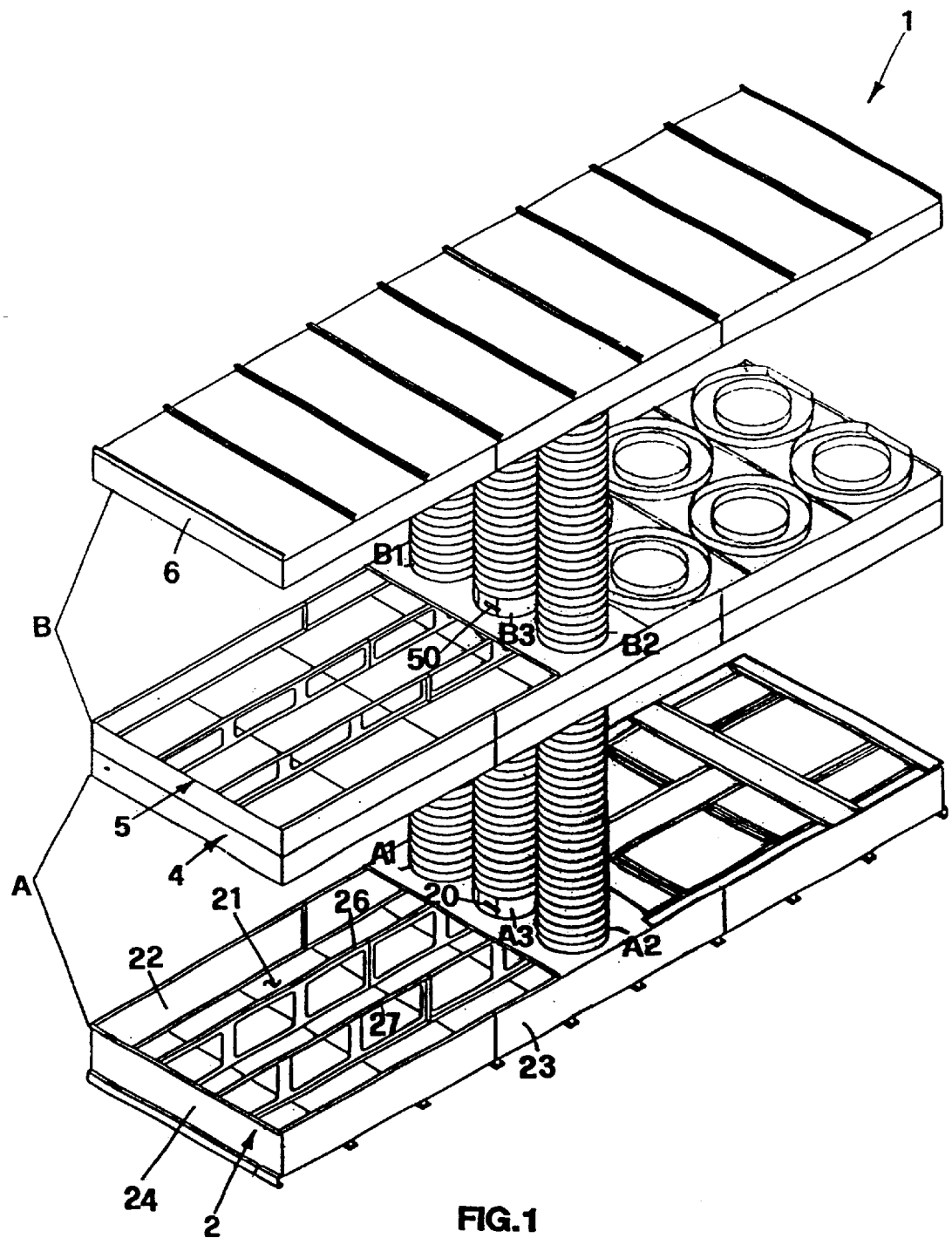
FIG. 1 shows an isometric view of the drying equipment under this invention provided with two treatment units.

With reference to the above figures and in particular FIG. 1 it can be seen that the equipment under this invention, generally indicated by 1, has two treatment units, indicated by A and B, one above the other and mobile as will be described below.

The treatment unit A has a bottom rectangular chamber 2 made by base metal panels 21, side metal panels 22 and 23 and end metal panels 24. At the opposite end of metal panel 24 the bottom chamber 2 is closed by the mouth of the air duct which is indicated by 3 in FIG. 2 and is connected at 25 over the whole face opposite end 24.

There are also sections 26 and 27 set upright that, as will be seen, hold the metal panels that will be used to support the bales of forage being treated.

Overhead, indicated by 4, there is the top chamber that basically has an identical construction to the bottom chamber 2, with the exception of being closed on all sides of the box. The hot air, heated by the heat exchanger 30 and delivered by the fan 31 coupled to the dehumidifier 32, through the duct 3, which blows throughout the whole bottom chamber, reaches the top chamber 4 through the lateral telescopic columns A1 and A2, as seen in FIG. 1 and in FIG. 3 where the airflows are also marked with arrows in solid lines.

An additional central telescopic column A3 transfers the hot airflow to the second treatment unit B. To be more precise, as can moreover be seen in FIG. 3, the hot air that rises through the telescopic column A3, and whose route is marked by the dotted arrows, reaches the bottom chamber 5 of treatment unit B covering the whole bottom chamber and by passing through side columns B1 and B2 reaching the top chamber 6. In this way even this chamber is affected by an airflow that is expelled through the formed metal panels that are mounted on their respective surfaces of the top and bottom chambers.

The treatment unit B also has an additional central telescopic column B3 which, as required, can be opened by a damper 50 that can add a given airflow to the air delivered by columns B1 and B2 that reaches the top chamber of the treatment unit B. The telescopic column A3 is also provided with a damper 20 that opens or closes the flow of air into the second top treatment unit B. It is clear that if the top unit B is not being used, it's supply of hot air is not necessary, which would anyhow be wasted and therefore the damper 20 shuts off the delivery of air to the top treatment unit B.

In practice when the damper 20 is open both treatment units A and B operate and the air flow in top treatment unit B can be controlled by modulating the damper 50.

Vice-versa if only the bottom treatment unit A is being used, it is sufficient to close the damper 20 thereby shutting off the air flow rising through the telescopic column A3.

Figure 2:
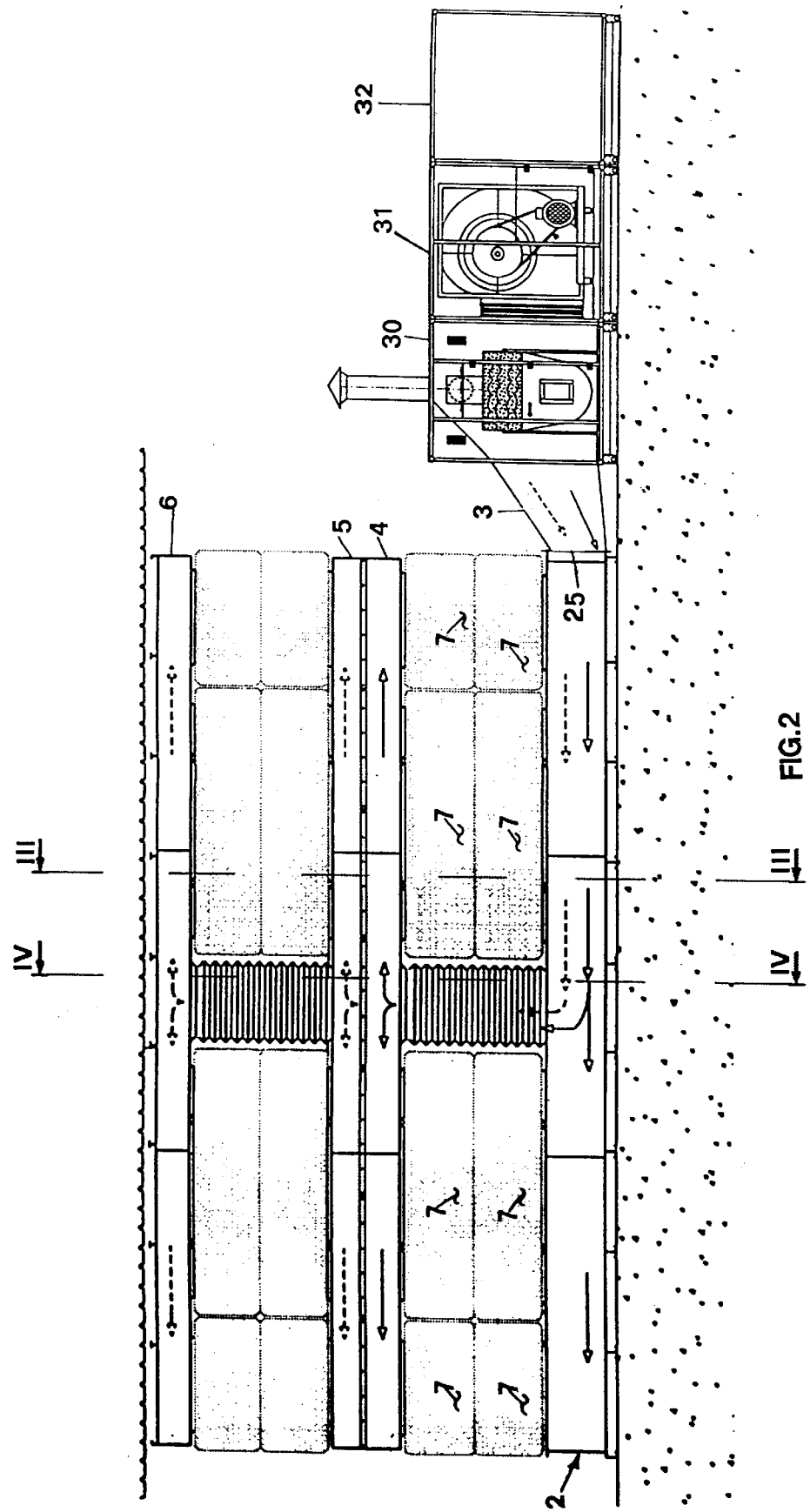
FIG. 2 shows a longitudinal section of the equipment in FIG. 1 which also indicates the hot air generator.
Figure 4:
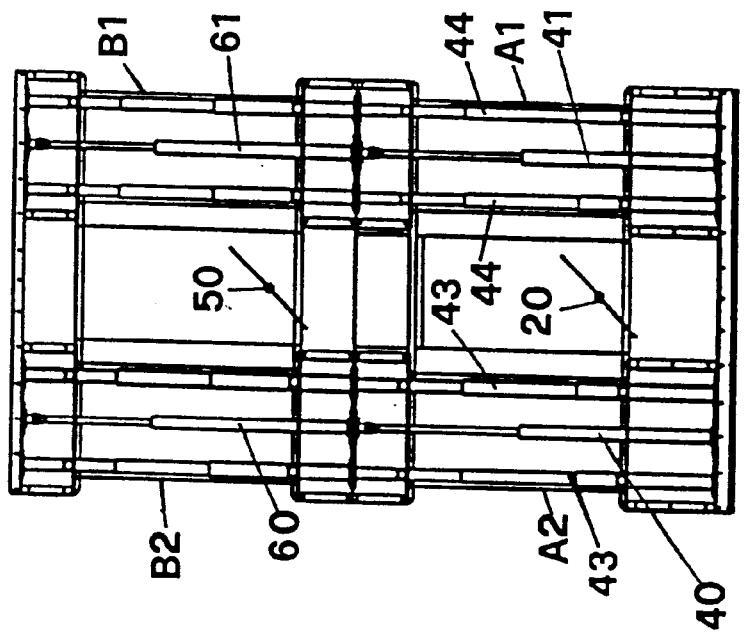
FIG. 4 shows another cross-section along line IV—IV in FIG. 2.

The height adjustment between the bottom chamber 2 and the top chamber 4 is obtained, as can be seen in FIG. 4, by spacer devices that, in this specific example, are the hydraulic jacks 40 and 41 mounted inside columns A2 and A1 respectively. In order to prevent problems of flexing, each of the hydraulic jacks is enclosed by telescopic tubes 43 set at 120° and 44 illustrated in FIG. 4 and set at 120° to each other, thereby preventing the respective jacks from flexing. It is clear that by means of the hydraulic cylinders 40 and 41, the top chamber 4 can be set at the correct height so that, as can be seen in FIG. 2, the bales of forage 7 are in direct contact with the support surfaces belonging to the top and bottom chambers. In a similar way, with regards the treatment unit B, there are also jacks 60 and 61 in columns B2 and B1 respectively. The hydraulic jacks 60 and 61 have the same function of spacing the top chamber 6 from the bottom chamber 5 so that the two layers of bales undergoing treatment are kept in close contact with the air venting surfaces.

In accordance with the invention each top chamber and each bottom chamber of the treatment units is fitted with metal panels provided with suitable apertures that, as the case requires, can be any of the types illustrated in FIGS. 5 to 8.

Figure 5:
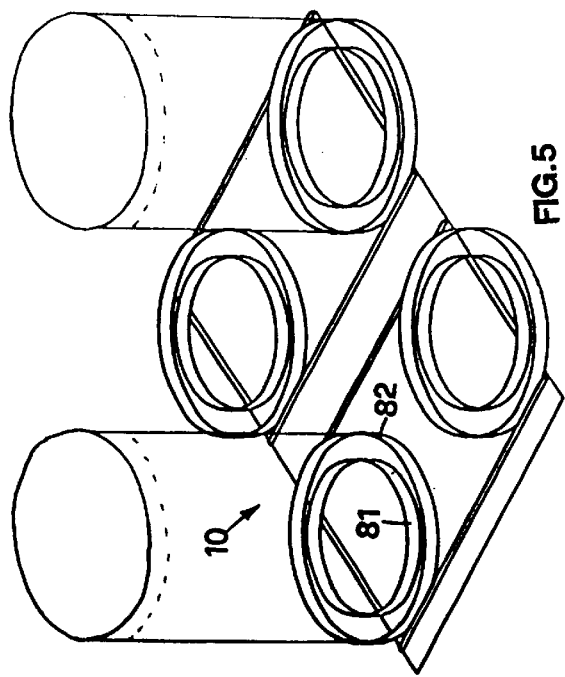
FIGS. 5 and 6 show two different types of metal panels suited to being set on surfaces of the top chamber and the bottom chamber for treating round bales.
Figure 6:
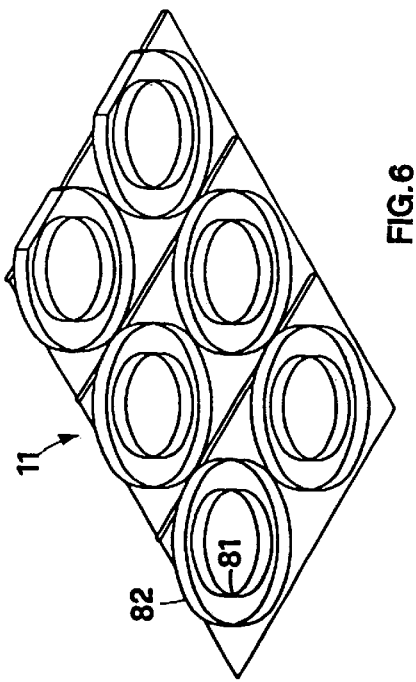

In the event that round type bales of forage have to be treated, the surface enclosed by the side walls 22 and 23 of the bottom chamber, as well as sections 26 and 27, will receive the metal panels shown in FIG. 5, or those shown in FIG. 6. More precisely, if the diameter of the round bales is between 1500 and 1800 mm., this example of the invention prescribes that panel 10 in FIG. 5 can host 4 bales to the left and 4 bales to the right of the columns A1, A2 and A3 standing on two metal panels of the kind shown in FIG. 5.

If instead the bales have, for example, a diameter of 1200 mm., the bottom chamber has to be fitted with the two metal panels illustrated in FIG. 6 indicated by 11, which have 6 circular holes. It can be noted that each circular hole in the metal panels shown in FIGS. 5 and 6 has an inside rim 81 and outside rim 82 basically perpendicular to the floor of the actual ring. The purpose of these rims is to channel the airflow thereby preventing hot air from following any direction other than the one required for drying the bale of hay. Naturally the metal panels illustrated in FIG. 5 and indicated by 10 and 11 and that are set on the bottom chamber, will likewise be mounted in the same way on the top chamber so that the double layer of bales undergoing treatment, as seen in FIG. 2, has streams of air from top and bottom with countercurrent flows. Naturally the above is valid for the second treatment unit B, over unit A, that will also be fitted with one or more metal panels 10 to 13, indicated in FIGS. 5 to 8.

Figure 7:
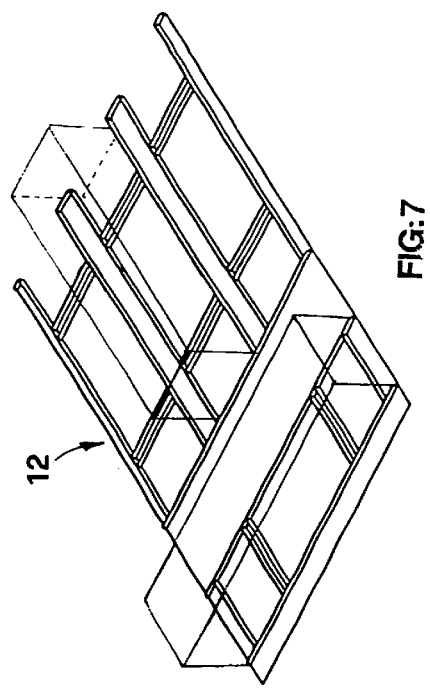
FIGS. 7 and 8 show metal panels suited to host different sized square bales

It can be seen that FIG. 2 illustrates the treatment both in unit A and in B, of square bales of forage indicated by 7. For these types of bales the metal panels mounted on the bottom chamber and fixed to the top chamber will be the same as those illustrated in FIG. 7 and indicated by 12 or in FIG. 8 indicated by 13. As can be seen in FIG. 7, the support panel 12 has spaces to hold bales of the same width and the same length. In this example the bales are 800 mm. wide, 2400 mm. long and 800 mm. high. If instead the bales are the kind having a base of 1200 mm. and in the same way a length of 2400 with a height of 600 mm., panel 13 has only three places to hold a layer of 3 bales for each side of the treatment unit, where side is intended as the left part or the right part of the columns that basically divide the treatment unit into two sections.

Figure 8:
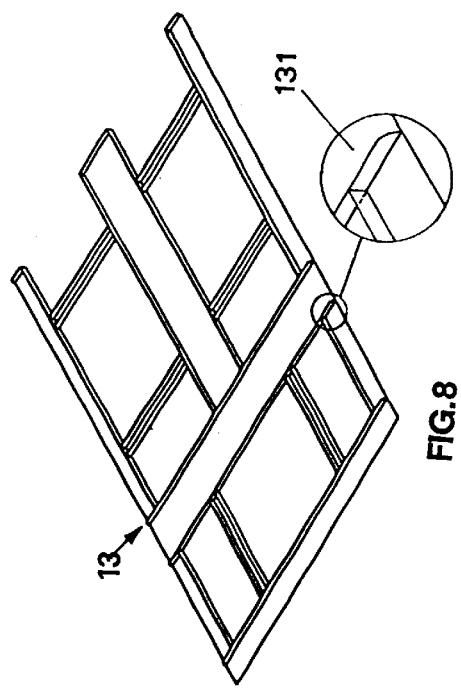

Even in the case of the support metal panels 12 and 13 shown in FIGS. 7 and 8, these are provided with rims to contain and channel the stream of hot air in order to avoid any possible dispersion, as shown in the detail 131 of FIG. 8.

Figure 3:
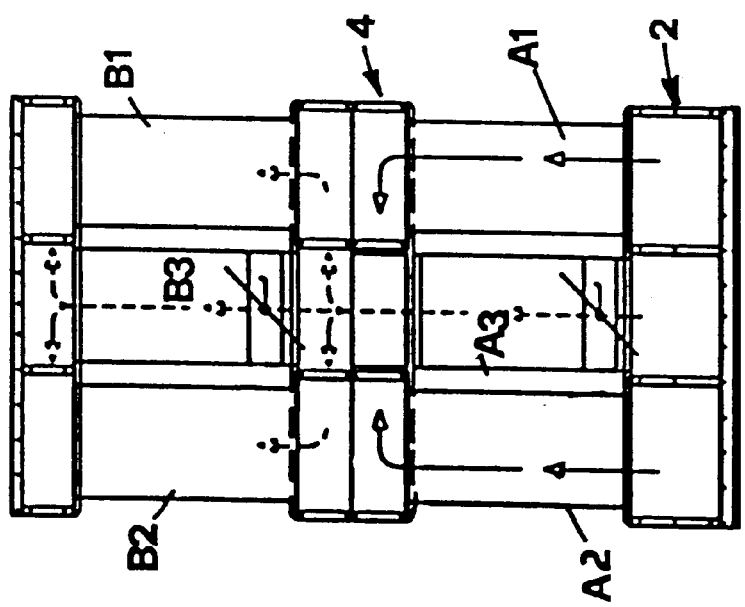
FIG. 3 shows a cross-section along line III—III in FIG. 2.

FIG. 2 and FIG. 3 use solid arrows to show the route of airflow for the treatment unit A and dotted arrows instead show the route of airflow that serves the top treatment unit B.

In FIG. 3 it can be seen how in treatment unit A, the top chamber is supplied by the columns A1 and A2 while the initial section of treatment unit B is supplied by column A3 that transfers air to the bottom base 5 of treatment unit B and then from this base 5, through the columns B1 and B2, and also eventually with the aid of the telescopic column B3, hot air is transferred to the top chamber 6.

A variant in execution of the drying equipment invention is illustrated in FIGS. 9 to 13 where it is generally indicated by 100.

Figure 9:
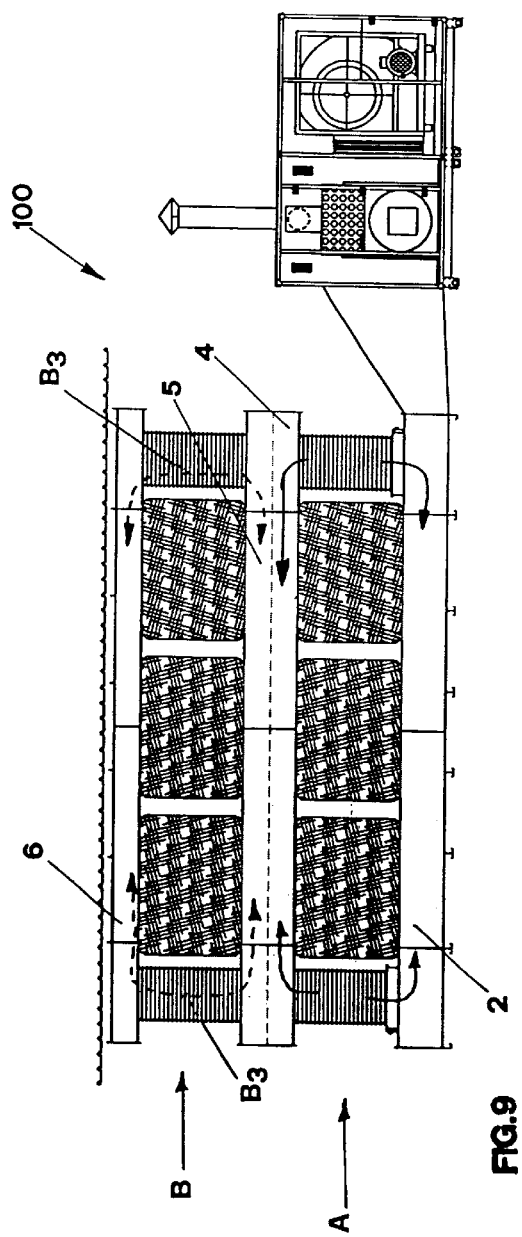
FIG. 9 shows a longitudinal section of a variant in execution of the equipment invention.
Figure 10:
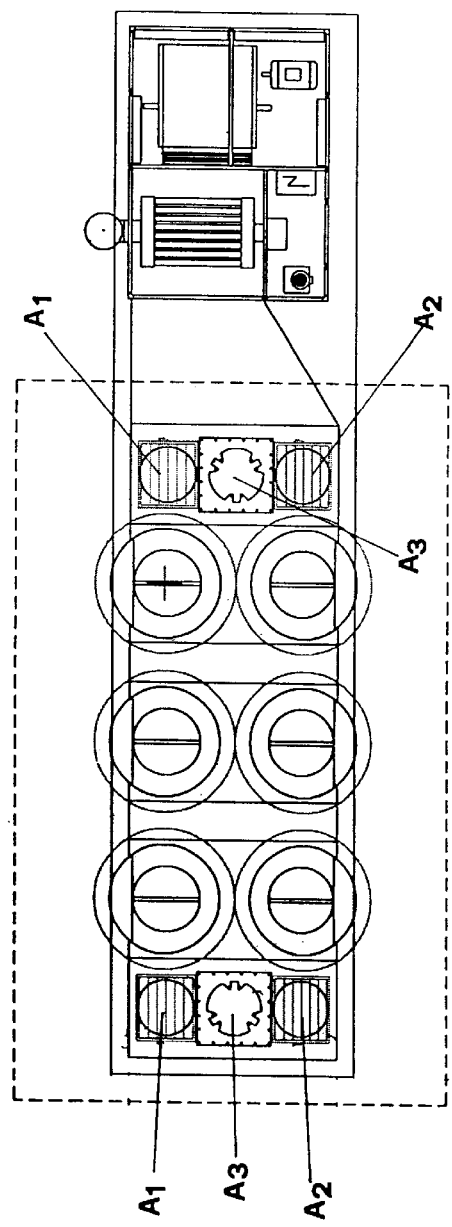
FIG. 10 shows an overhead view of the equipment in FIG. 9.
Figure 13:
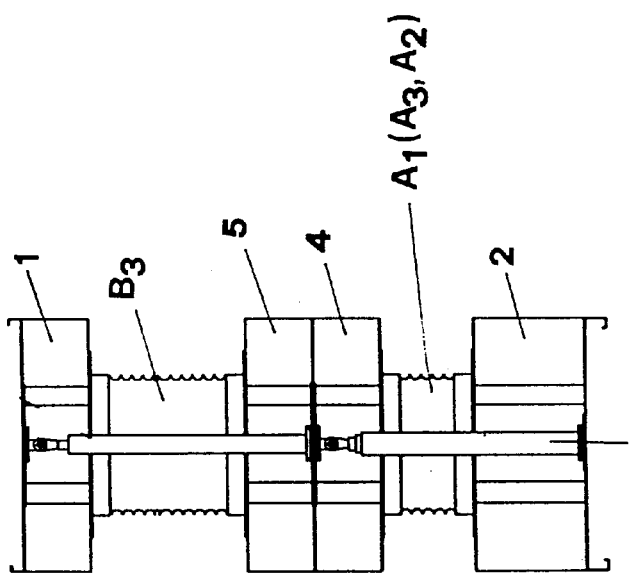
FIG. 13 shows the side view of FIG. 11.

It can be seen that this variant differs from the previous form of execution because the air channeling telescopic columns are set at the ends of the treatment units A and B, as can be seen in FIG. 9.

Figure 11:
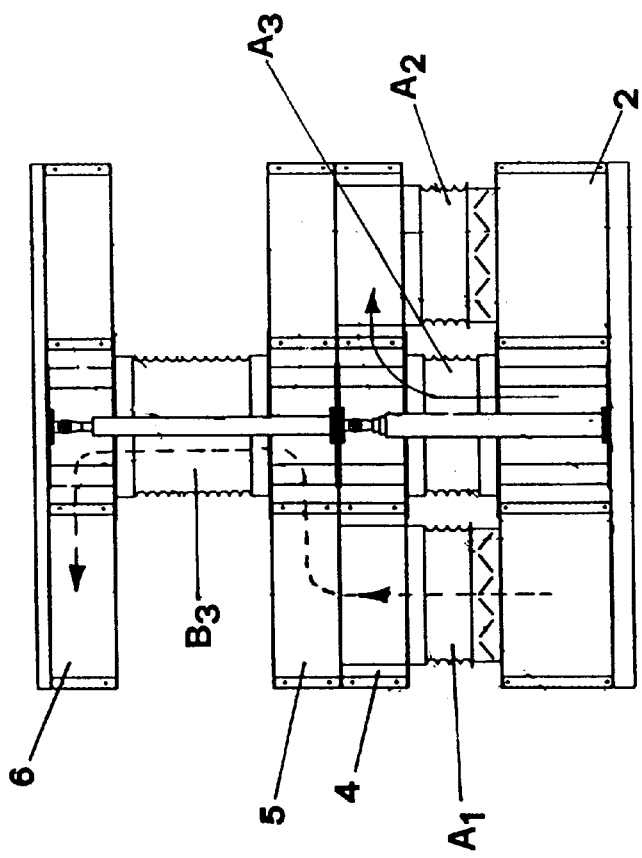
FIG. 11 shows the side view of a detail of the variant in execution of the equipment invention illustrated in FIG. 9.
Figure 12:
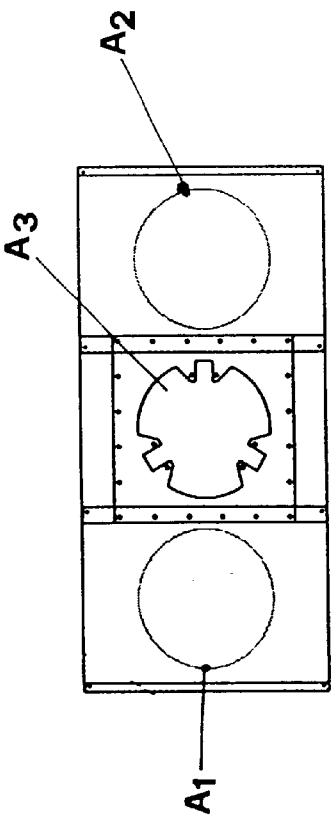
FIG. 12 shows an overhead view of FIG. 11.

At each end the ducting columns comprise, with reference to FIG. 11:
- a central column A3 belonging to the bottom treatment unit A that connects the bottom chamber 2 and the top chamber 4 of the bottom treatment unit A;
- a pair of lateral columns A1, A2 are set at the sides of the telescopic column A3, which channel hot air from the bottom chamber 2 of the bottom treatment unit A to the bottom chamber 5 of the top treatment unit B;
- a central telescopic column B3 belonging to the top treatment unit B that connects the bottom chamber 5 with the top chamber 6 of the top treatment unit B.

The existence of shutoff dampers 101, 102 in the lateral telescopic columns A1 and A2 respectively, allows to operate both the treatment units A and B at the same time or only the bottom treatment unit A.

To raise and lower the chambers there are spacer devices consisting of jacks 103, 104 set vertically and coaxially inside the central telescopic columns, B3 e A3 respectively.

It is clear that this variant in execution produces equipment that is more mechanically and structurally stable since the jacks 103, 104 are set at the ends of the chambers.

What's more less rising/lowering jacks are implemented against the previous execution.

This variant in execution gives the equipment a modular design because several treatment units can easily be placed side by side with their top and bottom chambers communicating.

Therefore, in view of the above explanations it is clear that the equipment under this invention, in each of its forms of executions, is made of two treatment units stacked over one another which, at the user's discretion, can be made to operate together or the bottom unit alone.

What's more both of the above types of equipment can dry bales of any shape and any size, and do so by merely requiring the replacement of the support metal panels of the top and bottom chambers that are set against the bales being dried thereby obtaining maximum performance from the plant since dispersion of air is practically nil.

Both executions are also suited to dehydration treatments that involve reducing the humidity content to below 15%, for this purpose it being enough to prolong the time the forage undergoes the treatment.

What is claimed is:

1. Equipment for drying bales of forage comprising:
   at least one unit for generating hot air equipped with a fan group that channels hot air onto at least one pair of treatment units stacked one over the other, each having a rectangular bottom chamber and a top chamber, kept apart by spacing devices having a rectangular bottom chamber and a top chamber, kept apart by spacing devices supporting the top chamber above the bottom chamber, and where one or more telescopic columns set between the bottom chamber and the top chamber transfer the hot air from the bottom chamber to the top chamber, said telescopic columns being operated by said spacing devices, said bales being set in each treatment unit between the bottom chamber and the top chamber stacked in two layers so that said bales can be dried by the countercurrent flow of hot air, wherein one or more of said telescopic columns is provided with shutoff dampers suited to opening/closing the air flow from the bottom treatment unit to the top treatment unit, wherein each of the two bottom chambers and top chambers is box shaped having a surface where one or more basically flat metal panels are removably connected and having holes shaped according to the shape of bale undergoing the drying treatment, and wherein said shutoff dampers selectively permit isolation of at least one of said treatment Units by opening/closing the air flow from one treatment unit to another treatment unit.

2. Equipment according to claim 1, wherein said one or more telescopic columns are set at an intermediary position between the bottom chambers and top chambers of each treatment unit that said telescopic columns connect.

3. Equipment according to claim 1, wherein said one or more telescopic columns are set at the ends of the bottom chamber and top chamber of each treatment unit that said telescopic columns connect.

4. Equipment according to claim 2, wherein there are three of said telescopic columns for each treatment unit and comprise a pair of lateral telescopic columns and one central column set between each pair of lateral columns.

5. Equipment according to claim 3, wherein each end of said equipment comprises four telescopic columns including two lateral and one central belonging to the bottom treatment unit and a single central telescopic column belonging to the top treatment unit.

6. Equipment according to claim 4, wherein each of said central columns of said bottom treatment unit contains said shutoff damper.

7. Equipment according to claim 5, wherein each of said lateral columns of said bottom treatment unit contains said shutoff damper.

8. Equipment according to claim 4, wherein said central column of said top treatment unit has a control damper.

9. Equipment according to claim 4, wherein the lateral columns of each of said treatment units connect together the bottom chambers and the top chambers.

10. Equipment according to claim 4, wherein the central column of the top treatment unit connects together the bottom chamber and the top chamber.

11. Equipment according to claim 4, wherein the central column of said top treatment unit communicates with the central column of said bottom treatment unit, said central column of said bottom treatment unit being connected with the bottom chamber of the actual bottom treatment unit.

12. Equipment according to claim 5, wherein the central column of the bottom treatment unit connects together the bottom chamber and the top chamber of the actual bottom treatment unit.

13. Equipment according to claim 5, wherein the lateral columns of said bottom treatment unit connect together the bottom chamber of the bottom treatment unit with the bottom chamber of the top treatment unit.

14. Equipment according to claim 5, wherein the central column of said top treatment unit connects together the bottom chamber and the top chamber of the actual top treatment unit.

15. Equipment according to claim 1, wherein said metal panel has several circular holes for hosting round bales.

16. Equipment according to claim 15, wherein there are four holes in each metal panel for treating eight round bales in two layers.

17. Equipment according to claim wherein there are six holes in each metal panel for treating twelve round bales in two layers.

18. Equipment according to claim 15, wherein said circular holes are enclosed by a ring having an inside diameter basically equal to the diameter of the hole and provided with rims basically perpendicular to the floor of said ring suited to channeling the air through the hole towards the bale undergoing treatment.

19. Equipment according to claim 1, wherein said one or more metal panels have a series of rectangular apertures suited to hosting square-shaped bales on each chamber.

20. Equipment according to claim 1 wherein the variable spacer devices in the top chamber from the bottom chamber are hydraulic jacks operated by a hydraulic unit.

21. Equipment according to claim 20, wherein the hydraulic jacks are set inside the telescopic air channeling columns.

* * * * *